Aug. 22, 1933.  E. H. NOELTING  1,923,163
BUMPER CONSTRUCTION
Filed Dec. 17, 1931
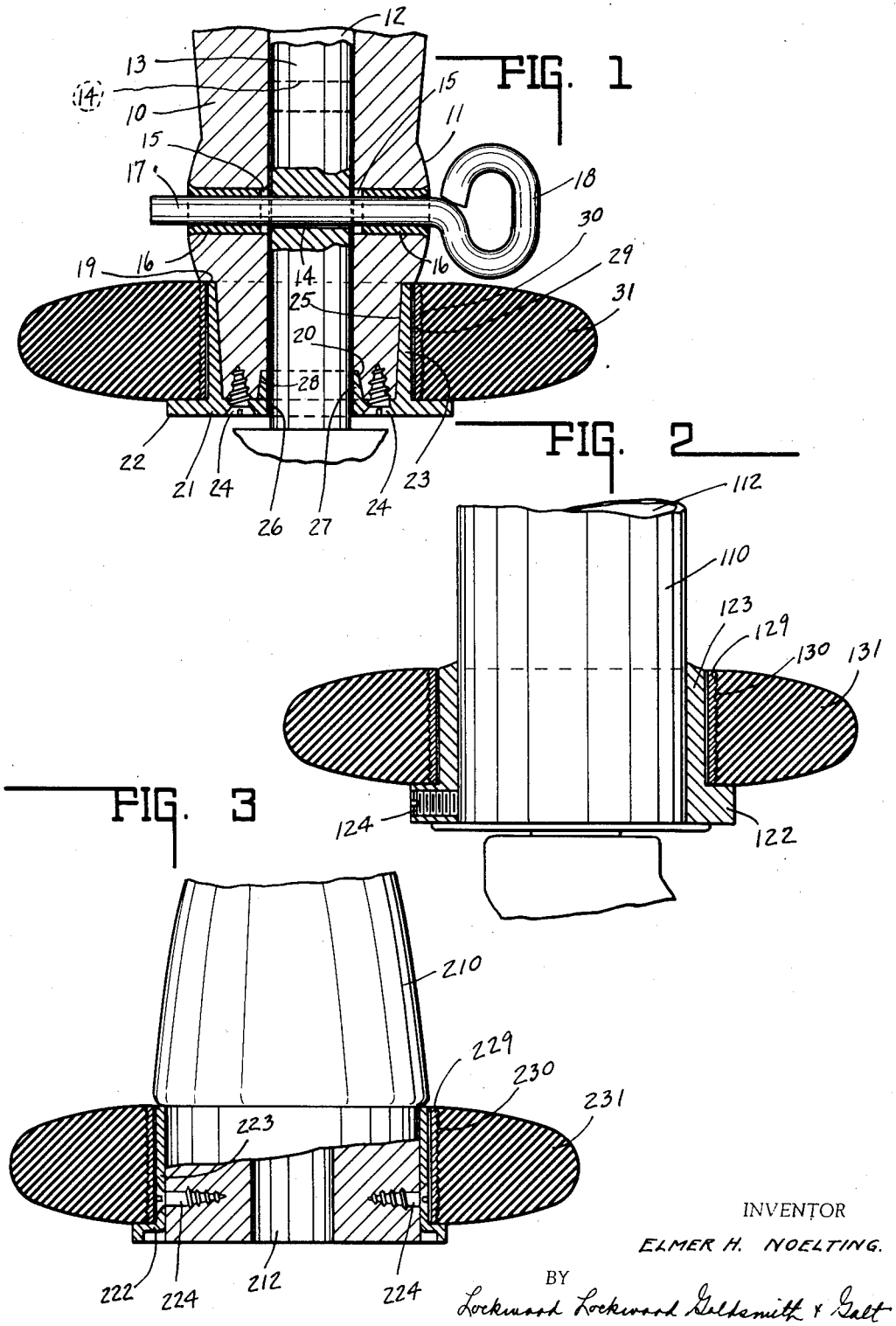
INVENTOR
ELMER H. NOELTING.
BY
Lockwood Lockwood Goldsmith & Galt
ATTORNEYS.

Patented Aug. 22, 1933

1,923,163

UNITED STATES PATENT OFFICE 1,923,163

BUMPER CONSTRUCTION

Elmer H. Noelting, Evansville, Ind., assignor to Faultless Caster Company, Evansville, Ind., a Corporation Application December 17, 1931
Serial No. 581,594

4 Claims. (Cl. 45—137)

This invention relates to a bumper construction for legs of furniture, beds, cabinets and the like adapted to receive a caster, slide and the like.

The chief object of this invention is to provide a bumper construction for association with a leg of the aforesaid character and a caster, slide and the like whereby the bumper protects the leg from damage and also protects the caster, slide and the like from damage incidental to lateral engagement.

One feature of the invention consists in the provision of a leg-mount construction adapted to support a peripheral cushioning bumper upon a tubular leg and prevents splitting of the leg whether of metal or wood.

The chief feature of the invention consists in the rotatable mounting of the cushion bumper so that upon wall engagement the direct shock is cushioned and the guard rotates on its support, thereby protecting the wall from being gouged and other damage incidental to the contact, and also protecting the hands from being pinched in the movement of the bed and like thereby toward a wall.

The full nature of the invention will be understood from the accompanying drawing and the following description and claims:—

In the drawing, Fig. 1 is a central sectional view through the bottom portion of a tubular leg, associated with which is a caster supporting member and the bumper construction as applied thereto.

Fig. 2 is a central sectional view through a modified form of bumper construction applied to a tubular metal leg, the latter being in elevation.

Fig. 3 is a similar view of a further modified form of bumper construction applied to a wooden leg, a portion of the latter being shown in elevation.

In the drawing, 10 indicates a tubular leg which, in the present form of the invention, is shown peripherally enlarged as at 11. The leg includes the bore 12 and mounted therein by any suitable means is a caster supporting member, the same being indicated by the numeral 13.

Herein said caster supporting member is an extension element of a caster construction and the same includes a plurality of transversely arranged spaced parallel openings 14. Extending transversely through the leg and communicating with the bore 12 is the opening 15. In the opening 15 at each end is a bushing 16 and mounted in said bushing and in one of the parallel spaced openings 14 is a caster support retaining member 17 having the handle portion 18. This construction is shown in the co-pending application, Serial No. 557,462, filed August 17, 1931.

The lower exterior portion of the leg is recessed as at 19 and the central bore 12 adjacent its mouth is recessed as at 20. Suitably secured to the underface or end of the leg 10, is a plate 21 which includes a laterally projecting portion 22 and the ferrule forming portion 23. In certain instances, said plate is suitably secured to the bottom of the leg as by the screws 24—see Fig. 1—although the ferrule may be secured as in Fig. 3. In certain instances, the interior of the ferrule 23 is tapered as at 25 for frictional seating of the leg mount upon the end of the leg.

The central opening 26 is herein shown registering with the bore 12 and is defined by a collar 27 which is inwardly tapered as at 28 when desired.

Peripherally enveloping the ferrule 23 and rotatably supported by ledge 22 is a metal sleeve 29 having a knurled periphery 30 by which an annular cushion rubber bumper 31 is molded to it. The bumper 31 is mounted upon the leg-mount construction including the plate and ferrule and then the latter is attached to the leg.

In Fig. 2 of the drawing, the bumper construction includes the sleeve 129 secured to the bumper cushion or ring 131 by molding the same, sleeve 129 being knurled as at 130. The bumper and sleeve rotates on the ferrule portion 123 of the leg-mount having the lateral projecting portion 122. Said leg-mount is illustrated as applied to a tubular metal leg 110 and secured thereto by set screw 124. The leg-mount, in this instance, is also a cast construction.

In Fig. 3 is illustrated a sheet metal leg-mount which is secured to a wooden leg 210 by screws 224. In this instance, bushing 229 is positioned on the leg above the final position and the leg-mount is secured in place. The bushing 229 rotates on ferrule 223 and is prevented from axial escapement by lateral projecting portion 222 of the leg-mount.

The invention claimed is:—

1. The combination with a tubular leg adapted to detachably receive a caster stem, of a detachable ferrule peripherally enveloping the leg for confining the end thereof, said ferrule including an integral outwardly directed flange adjacent its lower end, means rigidly securing said ferrule to the leg, and annular cushion means rotatably supported by the ferrule and retained upon the leg by the flange and including a metallic inner bushing and a cushion material outer peripheral portion projecting appreciably beyond the flange, said bushing having an outer periphery less than that of the flange.

2. The combination with a tubular leg adapted to detachably receive a caster stem, of a detachable ferrule peripherally enveloping the leg for confining the end thereof, said ferrule including an integral outwardly directed flange adjacent its lower end, means rigidly securing said ferrule to the leg, and annular cushion means rotatably supported by the ferrule and retained upon the leg by the flange and including a metallic inner bushing and a cushion material outer peripheral portion projecting appreciably beyond the flange, said ferrule having an inwardly directed integral portion underlying the end of the leg.

3. The combination with a tubular leg adapted to detachably receive a caster stem, of a detachable ferrule peripherally enveloping the leg for confining the end thereof, said ferrule including an integral outwardly directed flange adjacent its lower end, means rigidly securing said ferrule to the leg, annular cushion means rotatably supported by the ferrule and retained upon the leg by the flange and including a metallic inner bushing and a cushion material outer peripheral portion projecting appreciably beyond the flange, said ferrule having an inwardly directed integral portion underlying the end of the leg, and centrally apertured for caster reception, and an upwardly extending collar portion defining the ferrule aperture and forming an elongated side thrust bearing for the caster.

4. The combination with a tubular leg adapted to detachably receive a caster stem, of a detachable ferrule peripherally enveloping the leg for confining the end thereof, said ferrule including an integral outwardly directed flange adjacent its lower end, means rigidly securing said ferrule to the leg, annular cushion means rotatably supported by the ferrule and retained upon the leg by the flange and including a metallic inner bushing and a cushion material outer peripheral portion projecting appreciably beyond the flange, said bushing having an outer periphery less than that of the flange, said ferrule having an inwardly directed integral portion underlying the end of the leg, and centrally apertured for caster reception, and an upwardly extending collar portion defining the ferrule aperture and forming an elongated side thrust bearing for the caster.

ELMER H. NOELTING.